US007155299B2

(12) United States Patent
Yong et al.

(10) Patent No.: US 7,155,299 B2
(45) Date of Patent: Dec. 26, 2006

(54) METHOD AND APPARATUS FOR PRECISE MARKING AND PLACEMENT OF AN OBJECT

(75) Inventors: Siew Heng Yong, Singapore (SG); Piau Yew Foo, Singapore (SG)

(73) Assignee: Manufacturing Integration Technology Ltd, Singapore (SG)

( * ) Notice: Subject to any disclaimer, the term of this patent is extended or adjusted under 35 U.S.C. 154(b) by 315 days.

(21) Appl. No.: 10/856,765

(22) Filed: Jun. 1, 2004

(65) Prior Publication Data

US 2005/0275670 A1 Dec. 15, 2005

(51) Int. Cl.
*G06F 19/00* (2006.01)

(52) U.S. Cl. ........................... 700/114; 700/229; 347/2

(58) Field of Classification Search ................ 700/169, 700/111, 114, 222, 229; 219/121.68, 121.82; 257/758, 751, E23.179; 438/638; 382/141, 382/147, 218, 158
See application file for complete search history.

(56) References Cited

U.S. PATENT DOCUMENTS

| | | | | |
|---|---|---|---|---|
| 5,859,923 | A | 1/1999 | Petry et al. | |
| 5,920,481 | A | 7/1999 | Ichihara et al. | |
| 5,986,235 | A * | 11/1999 | Canella | 219/121.68 |
| 6,381,356 | B1 * | 4/2002 | Murakami et al. | 382/141 |
| 6,477,266 | B1 | 11/2002 | Asar | |
| 6,674,036 | B1 | 1/2004 | Mardi | |
| 6,692,978 | B1 * | 2/2004 | Tandy et al. | 438/26 |
| 6,720,567 | B1 | 4/2004 | Fordahl et al. | |
| 2003/0157762 | A1 * | 8/2003 | Peterson | 438/200 |

* cited by examiner

*Primary Examiner*—Kidest Bahta
(74) *Attorney, Agent, or Firm*—Lawrence Y.D. Ho & Associates

(57) ABSTRACT

The present invention provides a precise marking apparatus for performing precise marking on an object and methods of using the same. The precise marking apparatus comprises an object input handler and an object output handler for handling the object; a transport system for transporting the object handlers during a marking process; a vision inspection unit for capturing and/or processing the image of the object; a marking system for marking the object; and a control unit for receiving information from and sending instructions to other components of the precise marking apparatus.

32 Claims, 9 Drawing Sheets

METHOD AND APPARATUS FOR PRECISE MARKING AND PLACEMENT OF AN OBJECT

FIELD OF THE INVENTION

The present invention relates to methods and apparatuses for precise marking and placement of an object including an integrated circuit unit.

BACKGROUND OF THE INVENTION

Small objects such as integrated circuit (IC) and IC package are marked in different ways for inspection and identification. One of the popular ways for marking ICs is laser marking. During marking, the accuracy of the mark becomes critical due to constraint of the available area and increasing demand for characters to be marked. In many occasions where ICs require second marking, the area and location for second marking is even more constrained because of the presence of the first mark. Thus, precise and accurate marking positioning is very important in order to maintain the integrity of the mark with respect to the first mark.

An object may fail marking inspection in at least three ways. First is wrong marking. Second are cosmetic defects in the markings. And third is that the marked characters are offset or out-of-position from the desired location. This happens when the object is not properly positioned and at the same time the marking apparatus fails to correct the marking position.

The increasing demand for throughput and miniaturization of IC requires a new generation of handlers or handling systems being able to deliver high outputs at barely zero equipment assist. Therefore, there is an imperative need to have an apparatus that enables precise marking and placement. This invention satisfies this need by disclosing a precise marking and placement apparatus and method of using the same. Other advantages of this invention will be apparent with reference to the detailed description.

SUMMARY OF THE INVENTION

The present invention provides a precise marking apparatus for performing precise marking on an object and methods of using the same. The precise marking apparatus comprises an object input handler and an object output handler for handling the object; a transport system for transporting the object handlers during a marking process; a vision inspection unit for capturing and/or processing the image of the object; a marking system for marking the object; and a control unit for receiving information from and sending instructions to other components of the precise marking apparatus.

The present invention also provides a precise placement apparatus for precise marking and/or precise packaging an object and methods of using the same. The precise placement apparatus comprises an Input Stacker for storing and loading the object; a Main Track & Indexers for transporting the object; a Pick & Place (X, Y, θ Correction) for picking up the object and precisely placing the object for final packaging; an Inspection & Position Capture Camera for capturing the image of the object and optionally processing the captured image; an Output Stacker for unloading and outputting the precisely placed and optionally packaged object; and a control unit for receiving information from and giving instructions to other components of the precise placement apparatus.

The present invention further provides a precise marking and placement apparatus for performing precise marking on an object and precise placement of the object for final packaging and methods of using the same. The precise marking and placement apparatus comprises an object Input Handler for loading and holding the object; a Transport System for transporting the object handlers during a marking process; a pre-mark Vision Inspection Unit for capturing and/or processing the image of the object; a Marking System for marking the object; an object Output Handler for holding the marked object; a Pick & Place (X, Y, θ Correction) for picking up the object from the object output handler, carrying it over to the pre-placement Vision Inspection Unit and precisely placing the object for final packaging; an pre-placement Vision Inspection Unit for capturing the image of the object and optionally processing the captured image; an Output Stacker for unloading and outputting the precisely placed and optionally packaged object; and a Control Unit for receiving and processing information from the pre-mark Vision Inspection System and pre-placement Vision Inspection System and sending instructions to the components to execute precise marking and placement of an object to final packaging.

The objectives and advantages of the invention will become apparent from the following detailed description of preferred embodiments thereof in connection with the accompanying drawings.

BRIEF DESCRIPTION OF THE DRAWINGS

Preferred embodiments according to the present invention will now be described with reference to the Figures accompanied herein, in which like reference numerals denote like elements.

DETAILED DESCRIPTION OF THE INVENTION

The present invention may be understood more readily by reference to the following detailed description of certain embodiments of the invention.

Throughout this application, where publications are referenced, the disclosures of these publications are hereby incorporated by reference, in their entireties, into this application in order to more fully describe the state of art to which this invention pertains.

Current marking apparatus and process are confronted with two challenges. One is precision. Increasing information is marked onto an object. Another is marking dimension of an object. The object is becoming smaller and smaller. Thus the available space for marking is becoming smaller. This also demands higher precision. In addition, the automated inspection system demands precise packaging. With increased machine throughput and IC miniaturization, high-speed handlers will be more prone to pick & place errors resulting from equipment assist. The present invention provides solutions for the challenges.

Figure 1:
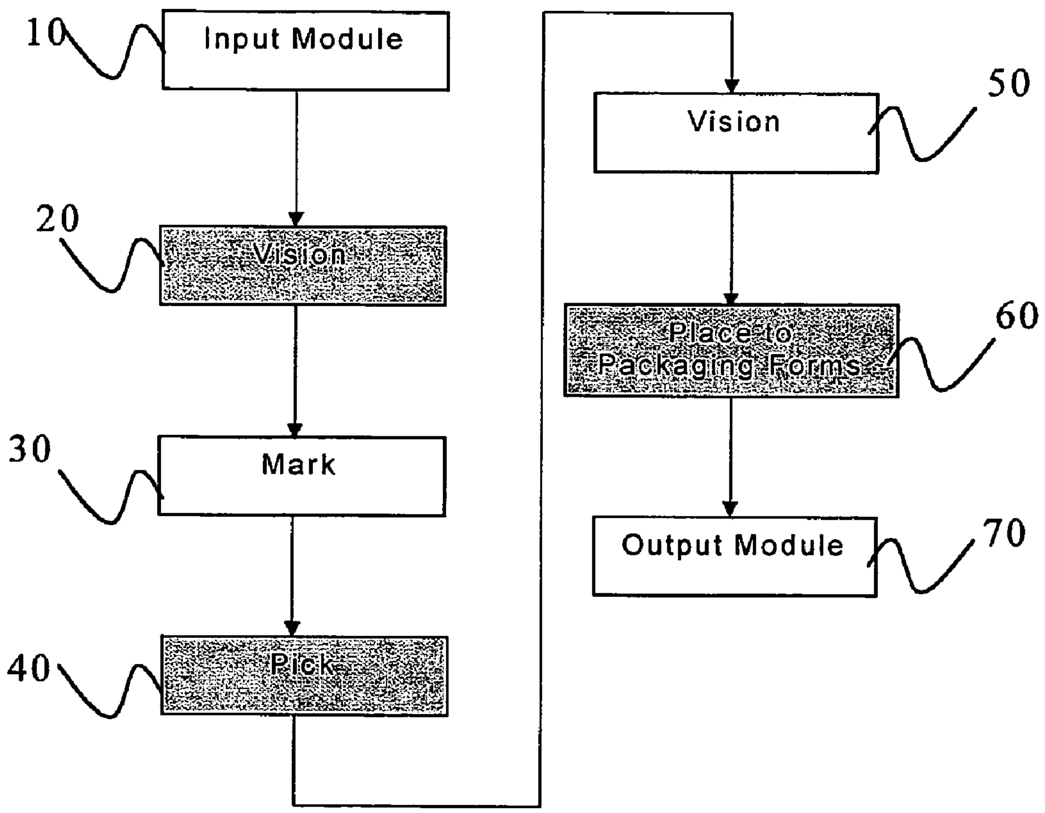
FIG. 1 is a flowchart of precise marking and placement of one preferred embodiment in accordance with the present invention.

Now referring to FIG. 1, there is provided a flowchart of precise marking and precise packaging resultant of precise placement in accordance with the present invention. The flowchart will be described briefly herein while each step will be discussed in detail later. In step 10, objects to be marked are transferred to a marking apparatus by the Input Module. Then the objects will be inspected by the Vision in step 20. The vision inspection will instruct the marking apparatus to mark the objects in precision in step 30. The marked objects will then be picked up for vision inspection before placement for packaging in step 40. The picked objects will be inspected in step 50. The vision inspection in step 50 will enable the objects to be placed precisely and packaged in step 60. Then the precisely packaged objects are stacked by the Output Module for further disposal in step 70.

Prior to detailed description of each step, it is to be appreciated that the present invention needs not to be practiced following the exact sequences as shown in the flowchart of FIG. 1. It will be evident from the discussion hereinafter that the flowchart of FIG. 1 may be divided into two separable events: one is the precise marking; and another the precise placement and packaging. Actually, these two events will be described separately in the present application for the sake of brevity and simplicity. As will be noted later, it should be easy for those skilled in the art to combine these two events if desired.

Therefore, precise marking will be described first. Then precise placement and packaging will be discussed.

Figure 2:
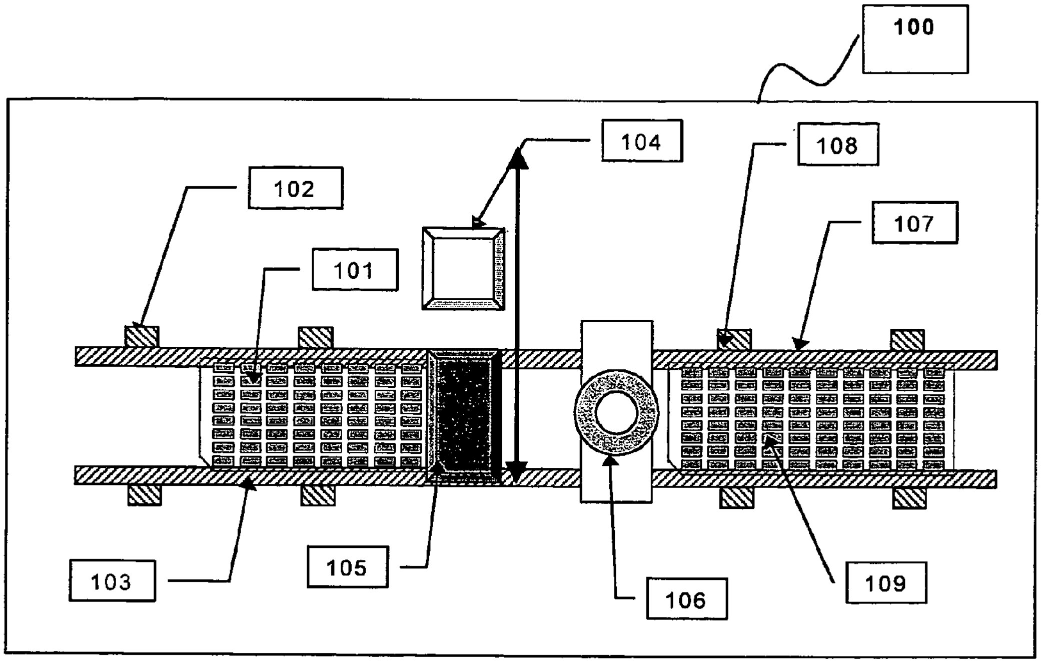
FIG. 2 is a diagrammatic view of the lay-out of the precise marking apparatus of one preferred embodiment in accordance with the present invention.

Now referring to FIG. 2, there is provided an apparatus for performing precise laser marking as one preferred embodiment in accordance with the principles of the present invention. The laser marking apparatus 100 comprises an IC units input handler 102 and an IC units output handler 108 that hold IC units singulated and contained in a shipping tray or IC units in a strip form; a transport system with an input track 103 and an output track 107 that transports the IC units handler during the laser marking process; a vision inspection unit 104 that captures the images of the IC units; a marking system 105 that marks the IC units; and a control unit 110 (not shown in FIG. 2) that receives information and sends instructions to other components of the apparatus as discussed below. FIG. 2 also shows the IC units on tray for marking 101 and the marked units on tray for output 109.

The IC units may have different dimensions and configurations. The laser marking apparatus of the present invention may also be applied to mark any forms of IC units including singulated individual IC units and strip-formed IC units. While the discussion herein is focused on IC units as an illustration of the application of the present invention, it is to be appreciated that the method and apparatus disclosed herein in accordance with the principles of the present invention are applicable to any suitable applications and objects.

The IC units handlers 102 and 108 may be any available devices that are suitable for handling any IC units as required by each specific applications. In certain embodiments, the IC units input handler 102 comprises a stacking means for storing IC units and an input means for unloading IC units in a position so as to be carried to a predetermined location for marking. The stacking means may be a slot magazine for IC units in strip form or a stacked shipping tray for singulated IC units. For a stacked shipping tray, the input means may be stepper motor driven elevating type so that the stacked trays will be dropped from top to a working position. Thus, each tray will be processed at each time when the trays are elevated to the working position. In certain embodiments, a pneumatic cylinder actuated singulator tabs can be used to isolate one tray to be processed. For a slot magazine, the slot magazine may be parked at input and output stations. During the marking process, the strips are moved along the transporting system. In certain embodiments, a stepper motor driven kicker arm may be used to push one strip at one time to the Indexer 1" so that the trip can be moved by the transporting system.

The IC units output handler 108 comprises a stacking means for storing the processed IC units, and an output means for loading the processed IC units into the stacking means. The stacking means may be similar or identical to the one employed in the IC units input handler 102. For example, the stacking means may be a slot magazine for IC units in strip form or a stacked shipping tray for singulated IC units. For a stacked shipping tray, the output means may be stepper motor driven elevating type so that each processed tray may be restacked in the stacked shipping tray. For a slot magazine, a stepper motor driven linear motion dragger may be used to load the processed IC strips to the offload slot magazine.

It is to be appreciated that any other means may be employed in this invention for storing the IC units and stacking/unstacking IC units so long as the means employed may function properly.

The transport system supports the transport of IC units from the input station parked by the IC units input handler 102 to the output station parked by the IC units output handler 108. In certain embodiments, the transport system comprises an input track 103 and an output track 107 along which the IC units can be transported from the input station to the processing positions to the output station. The transport system further comprises a transporting means not shown in FIG. 2. The transporting means moves the IC units in the IC units handlers from one position to another position along the transport supporting means. In certain embodiments, the transporting means may be a linear motion transporter, preferably a motor driven linear motion transporter and more preferably a Servomotor driven linear motion transporter. In addition, the transporting means may be configured in various ways. For example, the transporting means may employ three linear motion transporter: a first transporter receiving IC units in either a strip form or a shipping tray and transporting the received IC units to a position ready for processing; a second transporter receiving IC units from the ready position and transporting the IC units to a predetermined marking position; and a third transporter receiving IC units from the marking position and transporting the IC units to either the output stacker station or post-mark inspection station. Of course, the transporting means may employs one linear motion transporter that stops precisely at each position.

Figure 3:
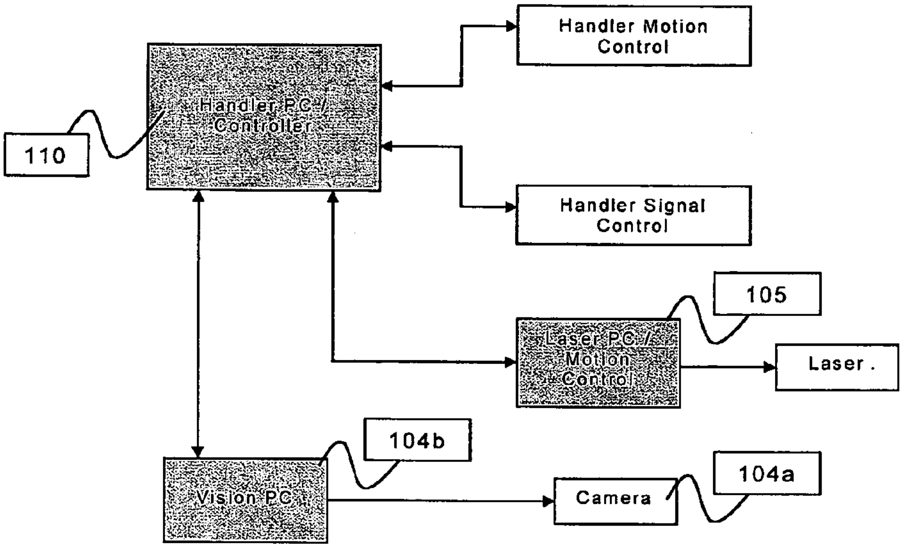
FIG. 3 is a circuitry block diagram of a precise laser marking apparatus of one preferred embodiment in accordance with the present invention.

The vision inspection unit 104 comprises an image capture unit 104*a* and a vision PC 104*b* for processing any image captured by the image capture unit, as shown in FIG. 3 discussed hereinafter. The vision PC 104*b* includes application programs that are used to execute the vision inspection and classification, and a system memory that includes memory space for storing the application programs, and initial, intermediate and finished data from execution of the application programs of the vision inspection and classification, where the data include gray scale image data, binary image data, and data of IC units outlines. While a specific example of the regeneration of the IC outlines is provided hereinafter as an illustration of the present invention, any other suitable application program may be employed so long as it can generate the IC outlines that may be compatible with the present invention. Preferably, the vision PC 104*b* is a microcomputer, and the system memory is a random access type of memory. Suitable microcomputers and memories are readily available in the market place. Their structure and operation are well known and, therefore, will not be described. It is to be appreciated that the vision PC 104*b* may be incorporated into the handler PC/Controller 110 as discussed below.

The image capture unit 104*a* includes a detection means and a light source. The IC units image which is an object of marking can be obtained by optically capturing the object with a camera or the like. The detection means to be used is not specifically limited as long as it is capable of converting the captured image of the object into an electric signal for output, so that it can be a charge-coupled device (CCD), a charge injection device, a photodiode array or a scanner. In one preferred embodiment, the detection means is a CCD camera. For example, the CCD camera is a progressive scan camera with a model number CV-M10BX from manufacturer JAI Coorporation. It will be apparent to those skilled in the art to utilize a different CCD camera.

In certain embodiments, an ordinary video camera is used as the camera, so that the captured image is outputted as an analogue video signal obtained by scanning a plurality of pixels. Accordingly, conversion of the analogue video signal into a digital signal represented in gray-scale (multi-valued image), conversion of the digital signal into a binary signal, conversion of the binary signal into a neighbor pixel state value, and calculation of the spot characteristics can be carried out in the vision PC 104b having a CPU, a ROM, a RAM, and an I/O port.

The light source is preferably a broad spectrum bulb that is configured to output light waves over a wide range of wavelengths. Preferably, the light source is optically coupled to an inspected IC unit. In a preferred embodiment, the light source is a LED lighting system, preferably a computerized LED lighting system. Various illumination methods are suitable for the present invention. The parameters that should be considered in choosing an illumination method include positions of the light source (e.g., front or back), illumination angle, effects of IC units surface, intensity of illumination, choice of lighting types, choice of diffuser, and optical alignment. In certain embodiments, the illumination method is preferably to be directional front lighting, with a suitable intensity level for achieving the best image acquisition results. The directional front lighting setup facilitates the design of IC units holder and the mounting of CCD vision camera for the inspection.

The marking system 105 may be any system that can maintain permanent marks on an IC unit so that any identification information can be incorporated into the permanent marks. The marking system 105 may be an ink printer or a laser marking device. In one preferred embodiment, the marking system 105 is the laser marking device that is preferably a Nd:YAG laser marking one, more preferably a Nd:YAG laser marking device with a Diode pump light source. In one specific embodiment, the parameters of the Nd:YAG laser marking device are about 50 watts for nominal power; about 133 mm for focal length; about 1064 nanometers for wavelength; and about 65 kHz for pulse frequency.

Now referring to FIG. 3, there is provided a circuitry block diagram of one preferred embodiment in accordance with the present invention. The marking system 105 is a laser marking system comprising a laser PC/motion control that executes instructions received from the handler PC/Controller 110. The handler PC/Controller 110 may be any suitable microprocessing system including a personal computer and a notebook. The handler PC/Controller performs two main functions. One is to map the marking location and IC units locations on the shipping tray. Another is to control the motions of the laser marking system and the image captured unit through their respective PCs. As discussed above, the vision PC and the laser PC may be incorporated into the handler PC/Controller.

Figure 4:
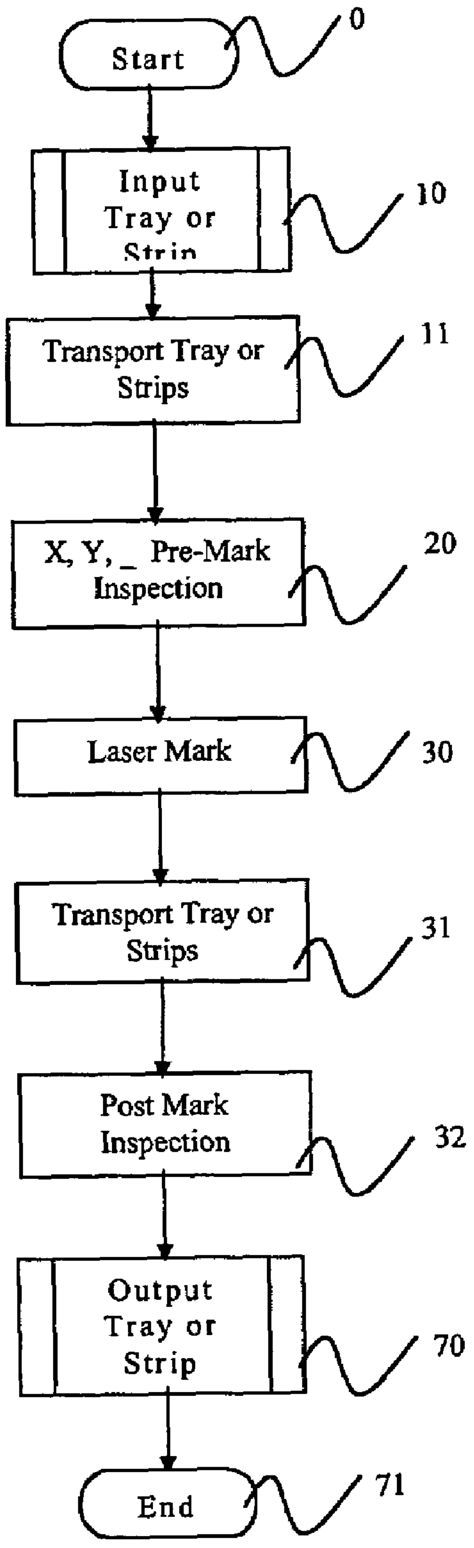
FIG. 4 is a precise laser marking process as one preferred embodiment in accordance with the present invention.

Now described is a precise laser marking process as one preferred embodiment in accordance with the present invention in reference to FIG. 4. After the marking apparatus is on, the IC units are loaded at the input station onto the input shipping tray or in a strip form in step 10. Then the IC units will be transported into pre-mark inspection position in step 11 by using the transporting system as discussed earlier. The pre-mark inspection in step 20 is performed when the vision camera moves along the row and captures/snaps the image of each of the IC units. Each IC actual positions X and Y are captured using a method described hereinafter in FIG. 5. After capturing the position of the first unit in the column the camera indexes along the column's axis to capture the next IC. After the whole column of IC is captured the data is communicated to the handler PC/Controller 110. The Handler PC/Controller 110 maps the IC's in the column with their respective coordinates. The Handler PC/Controller 110 also executes additional corrections in X and Y if the Vision and the Laser X & Y are not the same. After the data are processed, it is transmitted to the laser via the Laser PC. The laser fires the column of IC as in step 30. Indexes 2 moves the tray along the row axis to prepare the second column for the same process. After completing marking 1 tray, indexer 3 receives the completed tray and shuttles it to the offload stacker station in steps 31 and 70. It is noted that the post mark inspection in step 32 is optional. It may be done by any conventional means that can verify the quality of the laser marking.

Now referring to FIG. 5, there is now provided a detailed explanation of one preferred embodiment for vision capturing of IC position.

Figure 5A:
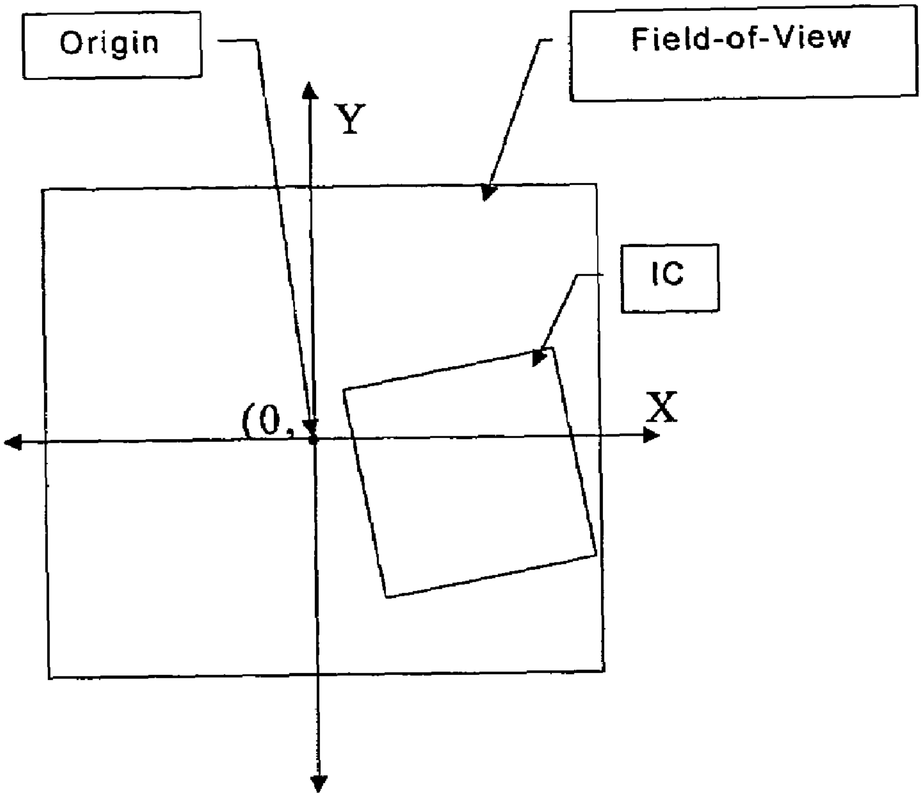
FIG. 5 shows a detailed explanation of one preferred embodiment for vision capturing of IC position.

Initially, the vision capture unit captures the image of each IC unit through its Field-of-View (FOV) as illustrated in FIG. 5A. The FOV has its default coordinates with its geometrical center as the origin (0,0). Then the vision PC uses the default coordinates of the FOV to commence the process of outline regeneration of the captured IC unit.

Figure 5B:
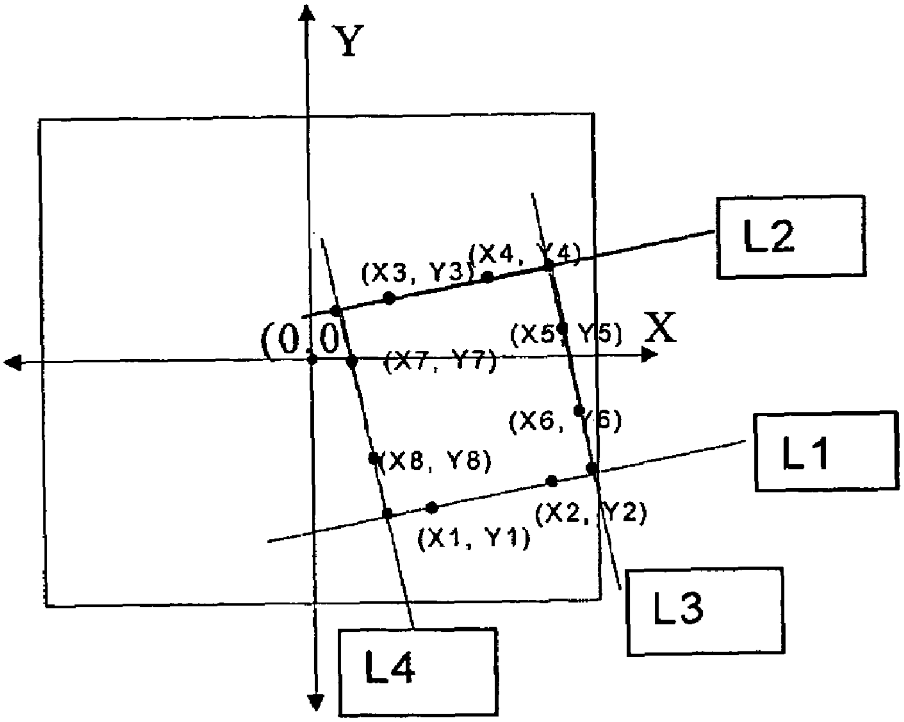

One IC unit has four sides designated as L1, L2, L3, and L4. The vision PC starts the outline regeneration process by identifying at least two points from each side as shown in FIG. 5B. One pair of coordinates are assigned to each point. For example, the two points on L1 are assigned as (X1, Y1) and (X2, Y2); the two points on L2 as (X3, Y3) and (X4, Y4); the two points on L3 as (X5, Y5) and (X6, Y6); and the two points on L4 as (X7, Y7) and (X8, Y8). Then, the Vision PC derives equations for each side. Through working the equations of L1, L2, L3, and L4, the intersections are computed and will form the corners of the IC outline. Thus, the IC image is now regenerated.

Figure 5C:
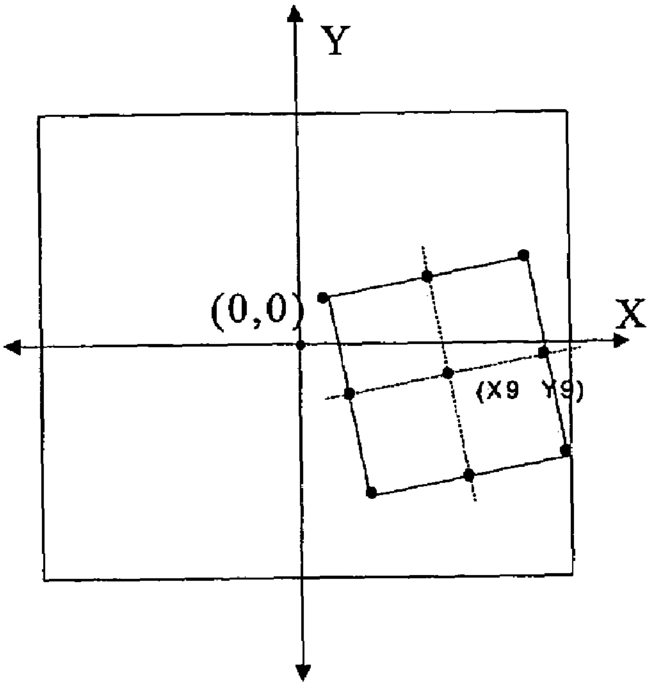
Figure 5D:
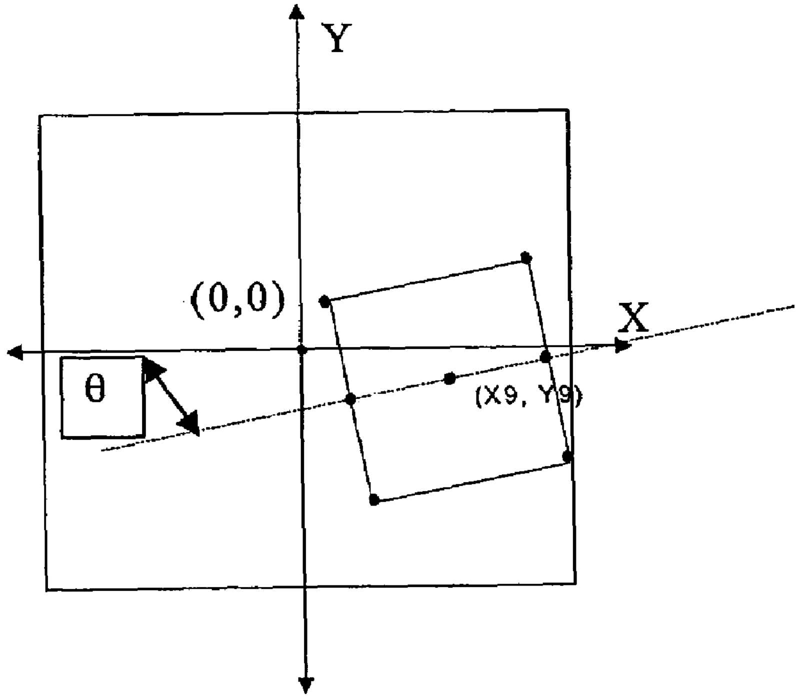

Next is the determination of the center of the regenerated IC outline. It can be done by computing the midpoints of the lines. The computed IC center is illustrated in FIG. 5C. The coordinates of the center are assigned as (X9, Y9). In similar manner, the theta of the IC outline is determined. As shown in FIG. 5D, the slope designated as Lc is formed by connecting the midpoint on L4, the center point and the midpoint on L3. The theta is defined as the angle between the Lc and the X axis in the FOV.

The Vision PC then transfers the data of each IC unit of a gang of IC units to the Handler PC/Controller. In certain embodiment, the gang of IC units may comprise a row of IC units.

So far the precise marking is done by pre-mark vision inspection. As discussed above, the precise marking for singulated IC units may also be reached by precise placement before the marking. This is the case when the steps 40 and 50 are done before step 30 of FIG. 1. Nonetheless, the following discussion will be focused on the precise packaging by precise placement. It is to be appreciated that the principles are readily applicable in combination with laser marking.

Now for singulated IC units to be packaged, there is provided an apparatus for precise placement of IC units before they are packaged.

Figure 6:
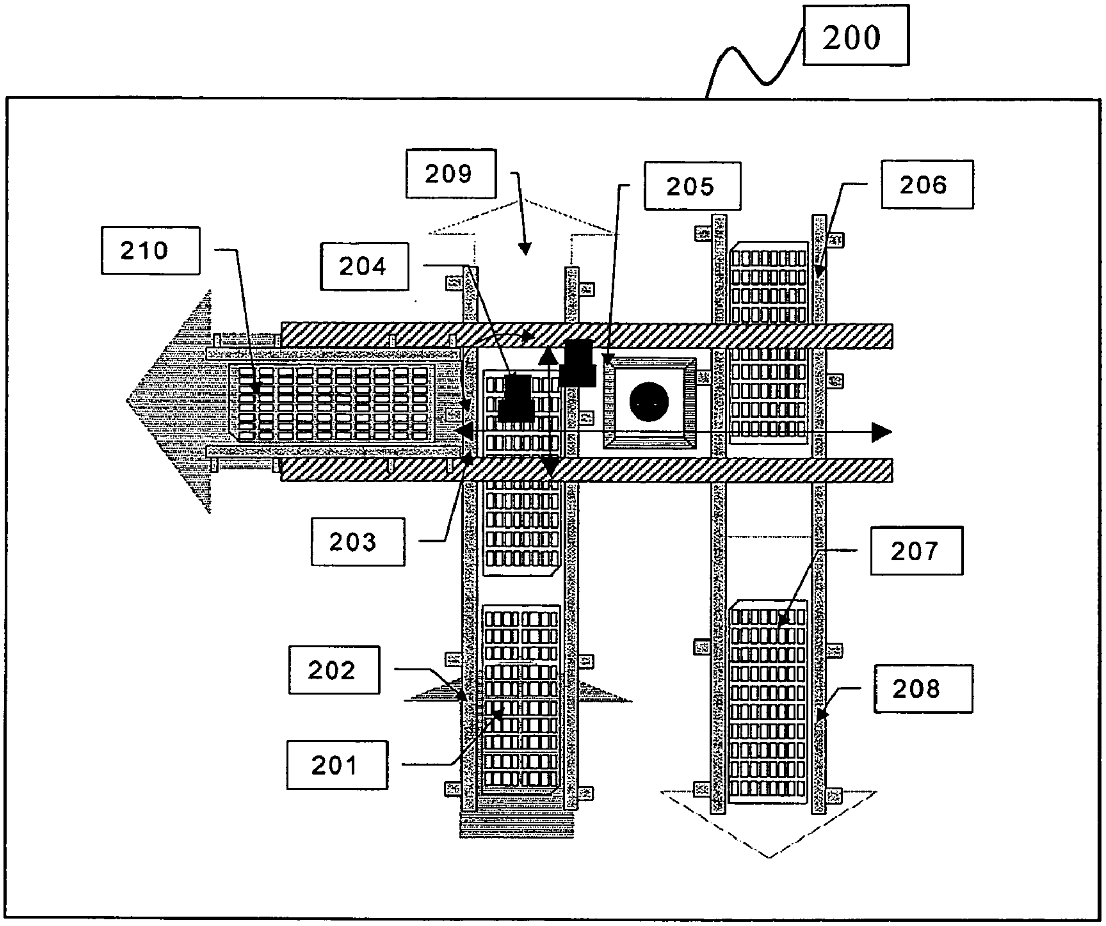
FIG. 6 is a diagrammatic view of the lay-out of the precise placement apparatus for placing IC units on shipping trays as one preferred embodiment in accordance with the present invention.

Referring to FIG. 6, one embodiment of the precise placement apparatus is illustrated in accordance with the present invention. This precise placement apparatus is for placing IC units on shipping trays. The apparatus 200 comprises Input Stacker 202, Main Track & Indexers 203, Pick & Place (X, Y, θ Correction) 204, Inspection & Position Capture Camera 205, Output Track 206, and Output Stacker 208. Also illustrated in FIG X are IC in Shipping Tray (Input) 201, IC in Shipping Tray (Output) 207, Output for Empty Tray 209, and Output for Reject IC Units 210. The application of this precise placement apparatus is not limited to any specific configurations and dimensions of IC units. Thus, the shipping trays may have different configurations and dimensions compatible with the IC units. Moreover, the Input Stacker 202, the Main Track & Indexers 203, the Output Track 206, and the Output Stacker 208 are similar, if not identical, to the ones described in the laser marking apparatus, so that there is no further description about these features.

The Pick & Place means 204 comprises at least one Smart Pick and Place system. In certain embodiments, the Pick & Place means 204 comprises two Smart Pick and Place systems that operate alternatively. Each Smart Pick and Place system comprises at least one pick-up module that picks up each IC unit from the input shipping tray 201 and places the picked IC unit in the output shipping tray 207. If the picked IC unit is rejected by the vision inspection (to be discussed later), the pick-up module will place the rejected IC units into the output tray 210 for rejected IC units. The pick-up module comprises at least one vacuum pick-up nozzle. In one preferred embodiment, the pick-up module comprises two vacuum pick-up nozzles that can transfer one IC unit at each motion. There are available of many conventional pick-up modules that can be employed in the present invention. The choices and arrangements of the pick-up modules are well known to those skilled in the art. Therefore, no more detailed discussion of the pick-up modules is needed.

The Smart Pick and Place System further comprises a driving module that operates the pick-up module. The driving module is able to adjust the pick-up module in X, Y, Z directions. More importantly, the driving module may operate to the theta precision. In preferred embodiments, the driving module is a motor including servomotor.

The Inspection & Position Capture Camera 205 is similar to the one in the laser marking apparatus as above described. In one preferred embodiment, the Inspection & Position Capture Camera 205 is located underneath the path along which the IC unit is picked-up from the input shipping tray and transferred to the output shipping tray.

Figure 7:
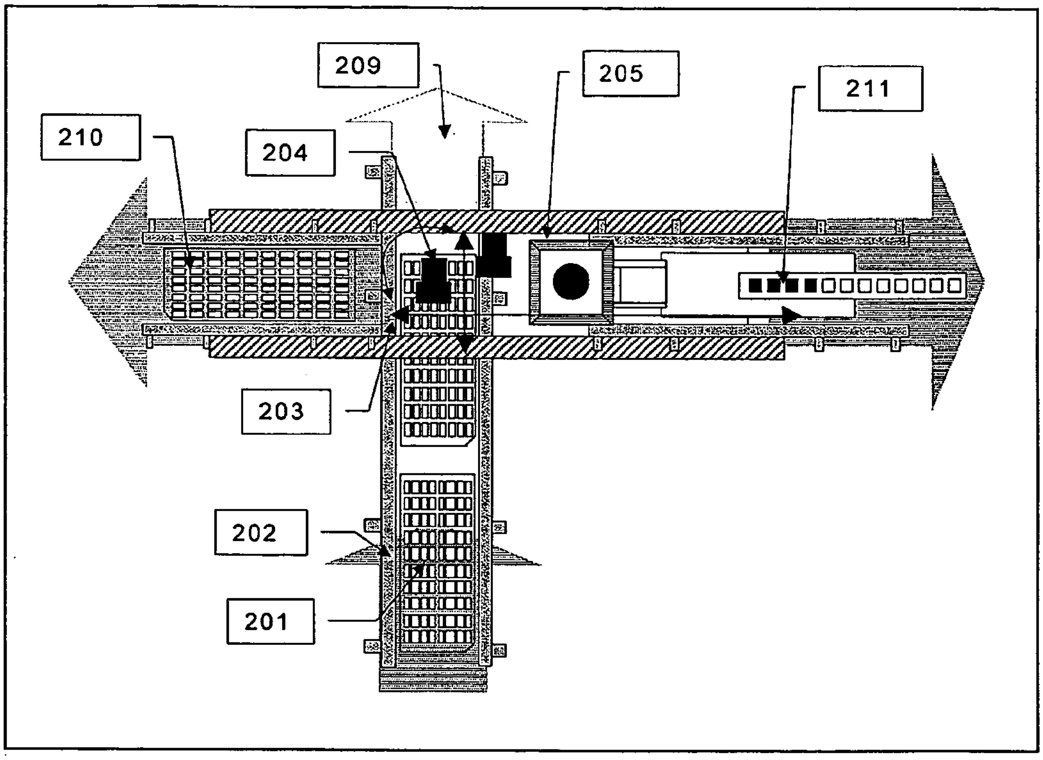
FIG. 7 is a diagrammatic view of the lay-out of the precise placement apparatus for placing IC units in strip form as one preferred embodiment in accordance with the present invention.

Referring to FIG. 7, another embodiment of the precise placement apparatus is illustrated in accordance with the present invention. This precise placement apparatus is for placing IC units on Tape and Reel. The apparatus is similar to the one described above except that the output module 211 is Tape and Reel, not Output Track 206, IC in Shipping Tray (Output) 207, and Output Stacker 208. The Tape and Reel output module is well known to those skilled in the art so that there is no more detailed description of the configurations and dimensions of the Tape and Reel output output module.

Figure 8:
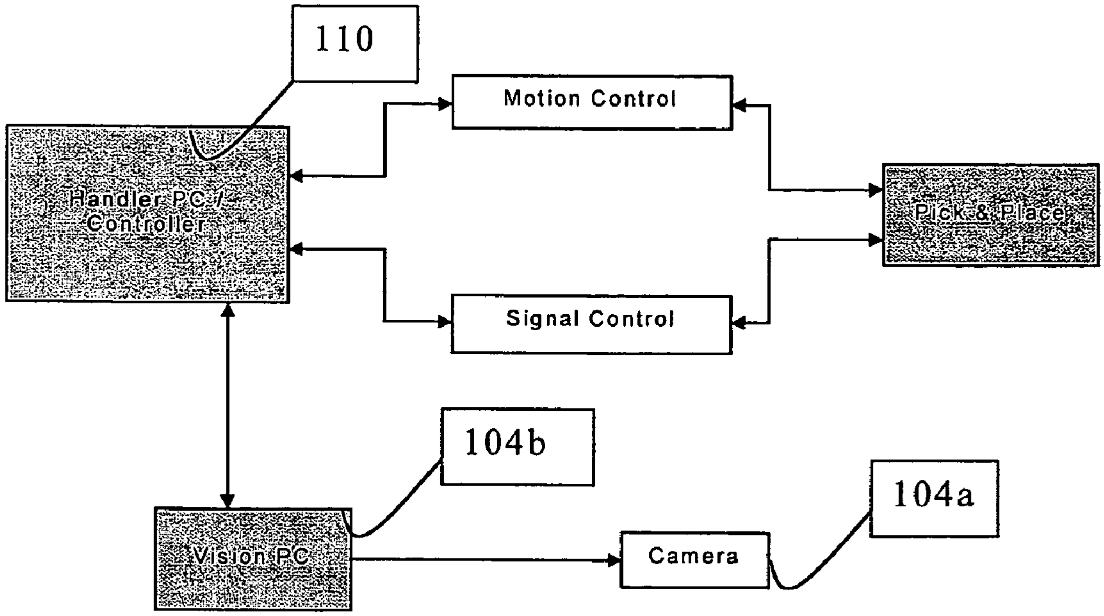
FIG. 8 is a circuitry block diagram of a precise placement and packaging apparatus of one preferred embodiment in accordance with the present invention.

Now referring to FIG. 8, there is provided a circuitry block diagram of one preferred embodiment in accordance with the present invention. The handler PC/Controller 110 may be any suitable microprocessing system including a personal computer and a notebook, as discussed above.

Figure 9:
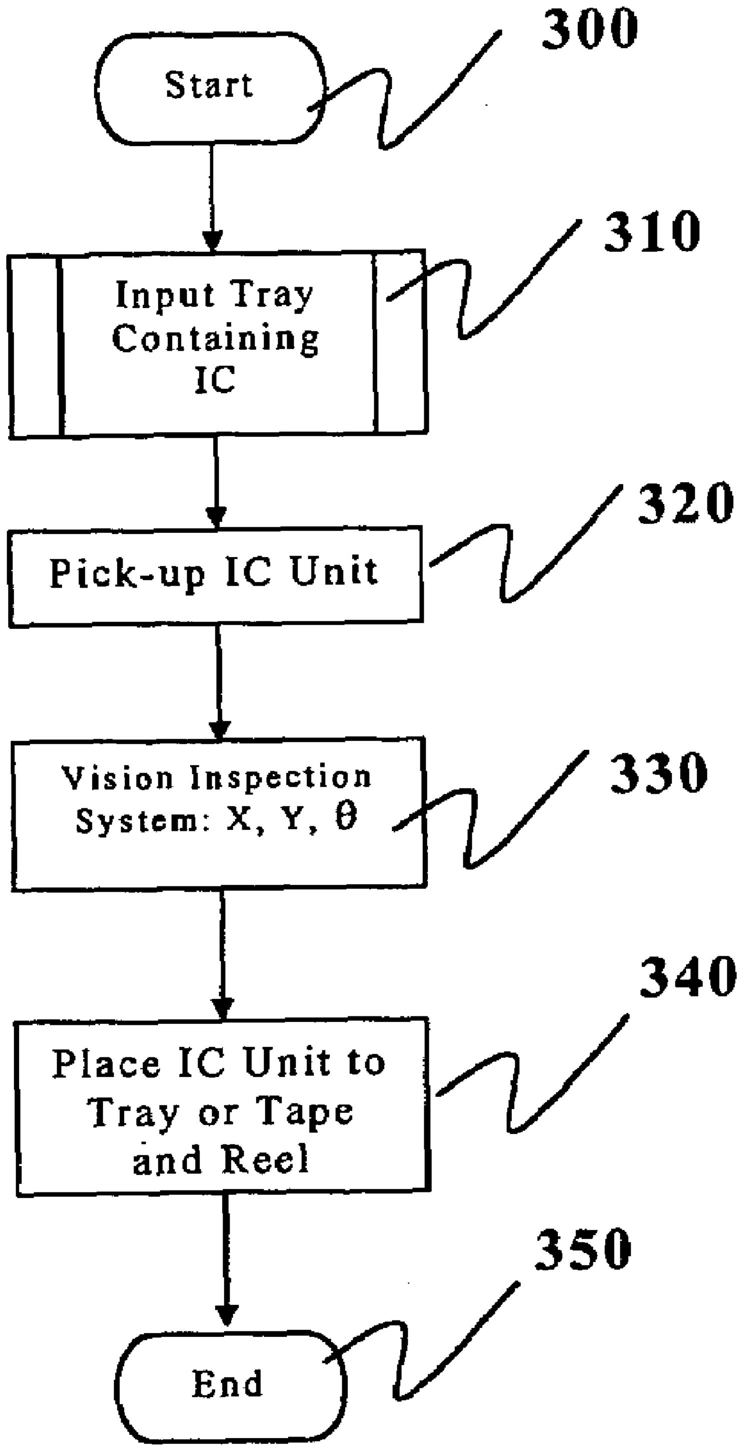
FIG. 9 is a precise placement and packaging process as one preferred embodiment in accordance with the present invention.

Now described is a precise placement for final packaging as one preferred embodiment in accordance with the present invention in reference to FIG. 9. After the placement apparatus is on 300, the IC units are loaded at the input station onto the input shipping tray or in a strip form in step 310. The vision camera is in a fixed position. The main track indexers transport IC units in tray into the defined working position. One of the alternating smart pick and place units picks up IC units from the tray 320. The first nozzle picks up an IC followed by the second nozzle. The two IC's are carried by the smart pick and place unit and brings it over the stationary inspection camera position. Then in step 330, the inspection camera captures the relative positions (X, Y, θ) of the two IC's, one after the other. Each IC actual positions X and Y are captured using a method described in FIG. 5. The inspection camera PC communicates these data to the Handler PC /Controller. The Handler PC/Controller maps the positions of the IC units and process the position data received. The processed data are communicated to the Smart Pick and Place unit via the motion control and input/output boards. The Pick and Place unit places the IC one at a time to the shipping tray according to the position data received in step 340. After processing one tray the empty tray goes to the empty tray output station. The indexer transports a new tray to the working area to do the same process. After all IC units have been processed, the apparatus will be off 350.

As discussed above, the precise marking and placement may be executed as an integral process. Therefore, the present invention provides a precise marking and placement apparatus for performing precise marking on an object and precise placement of the object for final packaging and methods of using the same. In one preferred embodiment, the precise marking and placement apparatus comprises an object Input Handler for loading and holding the object; a Transport System for transporting the object handlers during a marking process; a pre-mark Vision Inspection Unit for capturing and/or processing the image of the object; a Marking System for marking the object; an object Output Handler for holding the marked object; a Pick & Place (X, Y, θ Correction) for picking up the object from the object output handler, carrying it over to the pre-placement Vision Inspection Unit and precisely placing the object for final packaging; an pre-placement Vision Inspection Unit for capturing the image of the object and optionally processing the captured image; an Output Stacker for unloading and outputting the precisely placed and optionally packaged object; and a Control Unit for receiving and processing information from the pre-mark Vision Inspection System and pre-placement Vision Inspection System and sending instructions to the components to execute precise marking and placement of an object to final packaging.

The present invention also provides a precise marking and placement process for performing precise marking on an object and precise placement of the object for final packaging. The process comprises the steps of: loading the object onto an input object handler; transporting the object loaded in the input object handler into a vision inspection position by using a transporting system; inspecting the object by a pre-mark vision inspection unit, wherein the images of the object is captured and optionally processed by the vision inspection unit, and wherein the information of the object is transferred to a control unit that is connected to a marking system; marking the object pursuant to the instructions from the control unit to the marking system; unloading the marked objects onto an object output handler; picking up the object from the Input Stacker and passing the object over a pre-placement Inspection & Position Capture Camera by a Pick & Place (X, Y, θ Correction); inspecting the picked up object by the pre-placement Inspection & Position Capture Camera, thereby the information of the images is transferred to a control unit; and placing the inspected object precisely into the Output Stacker pursuant to the instructions from the control unit; thereby the object is precisely packaged.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

What is claimed is:

1. A precise marking apparatus for performing precise marking on an object, comprising:

an object input handler and an object output handler for handling the object;

a transport system for transporting the object handlers during a marking process;

a vision inspection unit for capturing and/or processing the image of the object, wherein the vision inspection unit outputs the information of the exact position of the object within the object input handler;

a marking system for marking the object, wherein the marking system is maneuverable in X, Y and theta directions so that it can mark the object within the object input handler at any predetermined marking area; and a control unit electronically coupled with the vision inspection unit and the marking system; wherein when the control unit receives from the vision inspection unit the information of the exact position of objects within the object input handler, the control unit maps the predetermined marking areas on the objects and controls the motions of the marking system to mark the objects on the mapped marking areas.

2. The precise marking apparatus of claim 1, wherein the object is an IC unit that may be singulated or in strip form.

3. The precise marking apparatus of claim 1, wherein the object input handler comprises a stacking means for storing the objects and an input means for unloading the objects in a position so as to be carried to a predetermined location for marking.

4. The precise marking apparatus of claim 3, wherein the object is an IC unit; wherein the stacking means is a slot magazine for the IC units in strip form or a stacked shipping tray for the singulated IC units; and wherein the input means is a stepper motor driven elevating device or a stepper motor driven kicker arm.

5. The precise marking apparatus of claim 1, wherein the object output handler comprises a stacking means for storing the objects and an output means for loading the objects onto the stacking means.

6. The precise marking apparatus of claim 1, wherein the transport system comprises an input track and an output track along which the objects can be transported, and a transporting means for moving the objects in the object handlers from one position to another position along the input and output tracks.

7. The precise marking apparatus of claim 6, wherein the transporting means comprises at least a linear motion transporter, preferably a motor driven linear motion transporter.

8. The precise marking apparatus of claim 1, wherein the vision inspection unit comprises an image capture unit for capturing images of the object, and an optional vision microprocessor for processing the captured image.

9. The precise marking apparatus of claim 8, wherein the image capture unit comprises a detection means selected from the group consisting of a charge-coupled device (CCD), a charge injection device, a photodiode array, a scanner, and a video camera.

10. The precise marking apparatus of claim 1, wherein the marking system may be an ink printer or a laser marking device.

11. The precise marking apparatus of claim 1, wherein the control unit may be a microprocessor.

12. A precise marking apparatus for performing precise marking on an IC unit, comprising:

an IC unit input handler and an IC unit output handler for handling the IC unit, wherein the IC unit input handler comprises a stacking means for storing the IC units and an input means for unloading the IC units in a position so as to be carried to a predetermined location for marking, and wherein the IC unit output handler comprises a stacking means for storing the IC units and an output means for loading the IC units onto the stacking means;

a transport system for transporting the IC units handlers during the marking process, wherein the transport system comprises an input track and an output track along which the IC units can be transported, and a transporting means for moving the IC units in the IC units handlers from one position to another position along the input and output tracks;

a vision inspection unit for capturing and/or processing the image of the IC units, wherein the vision inspection unit comprises an image capture unit for capturing images of the IC units, and an optional vision microprocessor for processing the captured image, wherein the vision inspection unit outputs the information of the exact position of the IC units within the IC units input handler;

a marking system for marking the IC units, wherein the marking system may be an ink printer or a laser marking device; and wherein the marking system is maneuverable so that it can mark the IC units within the IC unit input handler at any predetermined marking area;

a control unit for receiving information from and sending instructions to other components, wherein the control unit is a handler PC/Controller that may be a microprocessor; wherein the control unit is electronically coupled with the vision inspection unit and the marking system; wherein when the control unit receives from the vision inspection unit the information of the exact position of IC units within the IC units input handler, the control unit maps the predetermined marking areas on the IC units and controls the motions of the marking system to mark the IC units on the mapped marking areas.

13. The precise marking apparatus of claim 12, wherein the transporting means comprises at least a linear motion transporter, preferably a motor driven linear motion transporter.

14. The precise marking apparatus of claim 12, wherein the image capture unit comprises a detection means selected from the group consisting of a charge-coupled device (CCD), a charge injection device, a photodiode array, a scanner, and a video camera.

15. A precise marking process for marking an object, comprising the steps of:

loading the object onto an input object handler;

transporting the object loaded in the input object handler into a vision inspection position by using a transporting system;

inspecting the object by a vision inspection unit, wherein the images of the object is captured and optionally processed by the vision inspection unit, and wherein the information of the object is transferred to a control unit that is connected to a marking system, wherein the control unit is electronically coupled with the vision inspection unit and a marking system, and wherein the control unit receives the position information of the object within the input object handler, maps the marking area on the object, and controls the marking system to mark the object on the mapped marking area;

marking the object pursuant to the instructions from the control unit to the marking system; and unloading the marked objects onto an object output handler.

16. The precise marking process of claim 15, wherein the object is an IC unit, and wherein the outlines of the captured image of the IC unit is regenerated by the following steps of:

assigning a default coordinates to the captured image, wherein the default coordinates are the geometrical center as the origin (0,0);

designating the four sides of the IC unit as L1, L2, L3, and L4;

identifying at least two points from each side;

assigning one pair of coordinates to each point;

deriving equations for each side, thereby through working the equations of L1, L2, L3, and L4 to generate the outlines of the IC unit;

determining the center of the regenerated IC unit outline; and calculating the theta of the IC unit outline, wherein the theta refers to the angle between the IC and the X axis in the field-of-view.

17. A precise placement apparatus for precise placement of an object, comprising:

an Input Stacker for storing and loading the object;

a Main Track & Indexers for transporting the object;

a Pick & Place (X, Y, θ Correction) for picking up the object and precisely placing the object for final packaging, wherein the Pick & Place is capable of being moved in different directions;

an Inspection & Position Capture Camera for capturing the image of the object and optionally processing the captured image, wherein the Inspection & Position Capture Camera is capable of determining the orientation of the picked object by the Pick & Place;

an Output Stacker for unloading and outputting the precisely placed and optionally packaged object; and a control unit electronically coupled with the Pick & Place and the Inspection & Position Capture Camera, wherein when the control unit receives the orientation information of the object from the Inspection & Position Capture Camera, it adjusts the orientation of the picked object by operating of the Pick & Place so that the picked object can be accurately placed.

18. The precise placement apparatus of claim 17, wherein the object is an IC unit.

19. The precise placement apparatus of claim 17, wherein the Input Stacker comprises a stacking means for storing the objects and an input means for unloading the objects in a position so as to be carried to a predetermined location for inspection.

20. The precise placement apparatus of claim 19, wherein the object is an IC unit; Wherein the stacking means is a slot magazine for IC units in strip form or a stacked shipping tray for singulated IC units; and wherein the input means is a stepper motor driven elevating device or a stepper motor driven kicker arm.

21. The precise placement apparatus of claim 17, wherein the Output Stacker comprises a stacking means for storing the objects and an output means for loading the objects onto the stacking means.

22. The precise placement apparatus of claim 17, wherein the Main Track & Indexers comprises an input track and an output track along which the objects can be transported, and a transporting means for moving the objects in the object handlers from one position to another position along the input and output tracks.

23. The precise placement apparatus of claim 22, wherein the transporting means comprises at least a linear motion transporter, preferably a motor driven linear motion transporter.

24. The precise placement apparatus of claim 17, wherein the Inspection & Position Capture Camera comprises an image capture unit for capturing images of the object, and an optional vision microprocessor for processing the captured image.

25. The precise placement apparatus of claim 24, wherein the image capture unit comprises a detection means selected from the group consisting of a charge-coupled device (CCD), a charge injection device, a photodiode array, a scanner, and a video camera.

26. The precise placement apparatus of claim 17, wherein the Pick & Place (X, Y, θ Correction) comprises at least one Smart Pick and Place system, wherein the at least one Smart Pick and Place system comprises at least one pick-up module that picks up the object from the Input Stacker and places the picked object in the Output Stacker, and a driving module that operates the pick-up module, wherein the driving module is able to adjust the pick-up module in X, Y, Z directions.

27. The precise placement apparatus of claim 26, wherein the pick-up module comprises at least one vacuum pick-up nozzles that can transfer one object at each motion.

28. The precise placement apparatus of claim 17, wherein the control unit is a microprocessor.

29. A precise placement process for precise packaging of an object, comprising the steps of:

loading the object to an Input Stacker;

transporting the loaded Input Stacker through a Main Track & Indexers to a position where the object can be picked up and inspected;

picking up the object from the Input Stacker and passing the object over an Inspection & Position Capture Camera by a Pick & Place (X, Y, θ Correction), wherein the Pick & Place is capable of being moved in different directions;

inspecting the picked up object by the Inspection & Position Capture Camera, thereby the information of the images is transferred to a control unit, wherein the Inspection & Position Capture Camera is capable of determining the orientation of the picked object by the Pick & Place; and wherein the control unit is electronically coupled with the Pick & Place and the Inspection & Position Capture Camera, wherein when the control unit receives the orientation information of the object from the Inspection & Position Capture Camera, it adjusts the orientation of the picked object by operating of the Pick & Place so that the picked object can be precisely placed; and placing the inspected object precisely into an Output Stacker pursuant to the instructions from the control unit; thereby the object is precisely packaged.

30. The precise placement process of claim 29, wherein the object is an IC unit, and wherein the outlines of the captured image of the IC unit is regenerated by the following steps of:

assigning a default coordinates to the captured image, wherein the default coordinates are the geometrical center as the origin (0,0);

designating the four sides of the IC unit as L1, L2, L3, and L4;

identifying at least two points from each side;

assigning one pair of coordinates to each point;

deriving equations for each side, thereby through working the equations of L1, L2, L3, and L4 to generate the outlines of the IC unit;

determining the center of the regenerated IC unit outline; and calculating the theta of the IC unit outline, wherein the theta refers to the angle between the IC and the X axis in the field-of-view.

31. A precise marking and placement apparatus for performing precise marking on an object and precise placement of the object for final packaging, comprising:

an object Input Handler for loading and holding the object;

a Transport System for transporting the object handlers during a marking process;

a pre-mark Vision Inspection Unit for capturing and/or processing the image of the object; wherein the pre-mark vision inspection unit outputs the information of the exact position of the object within the object input handler;

a Marking System for marking the object, wherein the marking system is maneuverable in X, Y and theta directions so that it can mark the object within the object input handler at any predetermined marking area;

an object Output Handler for holding the marked object;

a Pick & Place (X, Y, θ Correction) for picking up the object from the object output handler, carrying it over to a pre-placement Vision Inspection Unit and precisely placing the object for final packaging; wherein the pre-placement Vision Inspection Unit for capturing the image of the object and optionally processing the captured image;

an Output Stacker for unloading and outputting the precisely placed and optionally packaged object; and a Control Unit for receiving and processing information from the pre-mark Vision Inspection System and pre-placement Vision Inspection System and sending instructions to the components to execute precise marking and placement of an object to final packaging.

32. A precise marking and placement process for performing precise marking on an object and precise placement of the object for final packaging, comprising the steps of:

loading the object onto an input object handler;

transporting the object loaded in the input object handler into a vision inspection position by using a transporting system;

inspecting the object by a pre-mark vision inspection unit, wherein the images of the object is captured and optionally processed by the vision inspection unit, and wherein the information of the object is transferred to a control unit that is connected to a marking system;

marking the object pursuant to the instructions from the control unit to the marking system; wherein the marking system is maneuverable in X, Y and theta directions so that it can mark the object within the object input handler at any predetermined marking area;

unloading the marked objects onto an object output handler;

picking up the object from the Input Stacker and passing the object over a pre-placement Inspection & Position Capture Camera by a Pick & Place (X, Y, θ Correction);

inspecting the picked up object by the pre-placement Inspection & Position Capture Camera, thereby the information of the images is transferred to a control unit; and placing the inspected object precisely into the Output Stacker pursuant to the instructions from the control unit; thereby the object is precisely packaged.

* * * * *